United States Patent
Carpenter et al.

(10) Patent No.: US 7,381,240 B2
(45) Date of Patent: Jun. 3, 2008

(54) PLATINUM PARTICLES WITH VARYING MORPHOLOGY

(75) Inventors: Michael K. Carpenter, Troy, MI (US); Ion C. Halalay, Grosse Pointe, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/560,471

(22) Filed: Nov. 16, 2006

(65) Prior Publication Data

US 2007/0113704 A1   May 24, 2007

Related U.S. Application Data

(60) Provisional application No. 60/739,741, filed on Nov. 23, 2005.

(51) Int. Cl.
   B22F 9/20   (2006.01)
   B22F 9/24   (2006.01)
   B22F 9/02   (2006.01)
   B01J 37/34  (2006.01)
   C22C 5/04   (2006.01)
   B01J 13/00  (2006.01)

(52) U.S. Cl. ............... 75/345; 148/430; 204/157.15; 204/157.42; 502/104; 977/777; 977/948

(58) Field of Classification Search ............ 75/335, 75/343, 953; 204/157.42, 157.62; 502/100, 502/101, 104

See application file for complete search history.

(56) References Cited

OTHER PUBLICATIONS

T. Fujimoto et al. Sonochemical Preparation of Single-Dispersion Metal Nanoparticles from Metal Salts. Chem. Mater. 2001, 13, p. 1057-1060; Mar. 2, 2001.*
R.A. Salkar et al. The Sonochemical preparation of amorphous silver nanoparticles. J. Mater. Chem., 1999, 9, p. 1333-1335.*
T.J. Mason, J.P. Lorimer, Applied Sonochemistry: Uses of Power Ultrasound in Chemistry and Processing. Copyright 2002, Wiley-VCH Verlag, GmbH &Co. KgaA, ISBN 3-527-302050, Chaper 3 "Synthesis", p. 75, 77, 78, 81, 86.*
Y. Mastai and A. Gedanken. Sonochemistry and Other Novel Methods Developed for the Synthesis of Nanoparticles Y. Mastai and A. Gedanken. In: C.N.R. Rao, A. Mueller and A.K. Cheetham, Editors, The Chemistry of Nanomaterials, Wiley-VCH, NY (Published online Jan. 28, 2005) p. 113, 115.*
P. Diodati, et al. Sonochemical production of a non-crystalline phase of palladium. Ultrason. Sonochem. 4 (1997) p. 45-48.*
S.A. Cotton. Chemistry of Precious Metals. Springer-Verlag : Chapter 3, "Palladium and Platinum", p. 173, 199.*
K.S. Suslick. The Chemical Effects of Ultrasound. Scientific American, Feb. 1989, p. 80, 83.*

(Continued)

Primary Examiner—Vickie Kim
Assistant Examiner—Mark L. Shevin

(57) ABSTRACT

Nanometer to micrometer sized particles containing platinum and having selected morphologies are prepared by a sonochemical process. A compound of platinum is dissolved, suspended, or diluted in a suitable liquid medium at a predetermined concentration and the liquid is maintained at a predetermined temperature from sub-ambient temperatures to above ambient temperatures. A reducing gas is bubbled through the liquid as it is subjected to cavitation at a controlled power to affect the reductive decomposition of the platinum compound. The morphology of the precipitated platinum particles can be varied widely by varying the described concentration, temperature and power parameters.

12 Claims, 1 Drawing Sheet

OTHER PUBLICATIONS

R.A. Caruso et al. Sonochemical formation of colloidal platinum, Colloids and Surfaces A: Physiochemical and Engineering Aspects 169 (2000) p. 219-225.*

Y. Mizukoshi et al. Preparation of Platinum Nanoparticles by Sonochemical Reduction of the Pt(II) Ion. Langmuir 15(8) p. 2733-2737 (1999), Available online Mar. 19, 1999.*

A. Gedanken. Using sonochemistry for the fabrication of nanomaterials. Ultrasonics Sonochemistry (2004) 11(2), p. 47-55, Available online Mar. 5, 2004.*

J.E. Park et al. Synthesis of multiple shapes of gold nanoparticles with controlled sizes in aqueous solution using ultrasound. Ultrasonics Sonochemistry 13 (2006) p. 237-241, Available online Jun. 2, 2005.*

K. Verschueren, John Wiley & Sons, Online Sep. 4, 2003, Handbook of Environmental data on Organic Chemicals (4th edition), "Decalin".*

L.H. Thompson and L.K. Doraiswamy, Sonochemistry: Science and Engineering. Ind. Eng. Chem. Res. 1999, 38, p. 1219-1221, 1228.*

K.S. Suslick and G.J. Price, Applications of Ultrasound to Materials Chemistry, Annu. Rev. Mater. Sci. 1999. 29: p. 304 and 305.*

T.S. Ahmadi et al. Shape-Controlled Synthesis of Colloidal Platinum Nanoparticles. Science 272 (5270) 1924-1925. (Abstract).*

U.S. Appl. No. 11/177,840, filed Jul. 8, 2006, Ion C. Halalay.

* cited by examiner

PLATINUM PARTICLES WITH VARYING MORPHOLOGY

This application claims the benefit of U.S. Provisional Application No. 60/739,741, filed Nov. 23, 2005, titled "Preparing Platinum Particles with Varying Morphology," and which is incorporated herein by reference.

TECHNICAL FIELD

This invention pertains to the preparation of small platinum particles, especially for catalyst applications. More specifically, this invention pertains to sonochemical methods of preparing platinum particles with different morphologies.

BACKGROUND OF THE INVENTION

Small metallic platinum particles are used in a wide range of catalytic applications including fuel cell anodes and cathodes, automotive catalysis, hydrocarbon reforming, and carbon monoxide cleanup via the water-gas shift reaction. Surface studies have shown that the rates at which such catalyzed reactions proceed are affected by the specific morphology of the platinum particles. Conventional platinum deposition methods provide no opportunity for variation in platinum particle morphology and typically yield only generally spherical particles with smooth (if porous) surfaces. Small spherical platinum particles can provide a large surface area per gram of particles, but there remains a need for a general method of making small platinum particles of differing morphologies, especially with different surface characteristics, so that a preferred particle shape may be made for a specific catalyst application.

SUMMARY OF THE INVENTION

The invention uses high-intensity sound waves applied to a suitable inert liquid to induce the reduction (decomposition) of suspended or dissolved precursor compound(s) of platinum. The use of high-intensity sound to induce chemical reactions is called sonochemistry. In the practice of this invention, metallo-organic, organometallic, and/or halide compounds of platinum are suitable. Some platinum compounds, such as chloroplatinic acid and ammonium platinum (II) dinitrite, can be dissolved in water or water-alcohol mixtures. Other platinum-containing compounds, such as bis (ethylenediamine) platinum (II) dichloride, dimethyl (1, 5-cyclooctadiene) platinum (II), and platinum (II) acetylacetonate, can be suspended as particles or dissolved in low-vapor pressure liquids. Generally inert, low vapor pressure hydrocarbon liquids such as decalin, tetralin, or tridecane are suitable for this purpose.

High-intensity sound waves, for example at about 20 kHz, are generated in the liquid to produce cavitation. Small bubbles are continually produced which rapidly expand and collapse. The extreme temperature and pressure conditions created inside and in the immediate vicinity of the collapsing bubbles lead to the decomposition of the platinum precursor compound, while the high cooling rates to the surrounding relatively massive liquid yield very small platinum particles with metastable (possibly amorphous) structure. The platinum particles are of nanometer or micrometer size. In order to avoid oxidation of the small metal particles, a reducing gas such as hydrogen gas is bubbled through the liquid. In addition, the liquid may be separately covered (blanketed) with an inert gas such as argon.

The morphology of the platinum particles that are formed is affected by compositional and process parameters such as: the composition and physical properties of the liquid sonochemical medium, the composition and concentration of platinum precursor material, the duration and power level of the application of ultrasonic vibrations, and the bulk temperature of the liquid medium. The temperature of the liquid medium is believed to have a very substantial effect on the morphology of the particles. In general, clusters of agglomerated smaller (nanometer size), smooth surface, spherical platinum particles are formed when the liquid is maintained at sub-ambient temperatures. Below-ambient temperatures also further desirably reduce the liquid's vapor pressure and minimize loss of volatile reactants during application of the high-frequency sound (ultrasound). However, above-ambient reaction medium temperatures yield larger (micron-size) platinum particles. While the larger particles are generally spherical they display fuzzy surfaces, covered with sharp spikes that provide large surface areas for catalytic effects on chemical reactions. Thus, in particular, the bulk temperature of the sonochemical reaction medium may be adjusted from below-ambient temperatures to higher temperatures to yield different platinum particle shapes and catalytic properties. However, above-ambient reaction medium temperatures yield larger (micron-size) platinum particles. While the larger particles are generally spherical they display fuzzy surfaces, covered with sharp spikes that provide large surface areas for catalytic effects on chemical reactions. Thus, in particular, the bulk temperature of the sonochemical reaction medium may be adjusted from below-ambient temperatures to higher temperatures to yield different platinum particle shapes and catalytic properties.

The sonic energy, which is controlled to affect particle morphology, is applied for a time determined for decomposition of the platinum metal precursor content of the liquid. After the sonic vibrations are stopped, the solid phase is separated from the liquid and any inorganic or organic compounds washed or dissolved from the platinum particles. The particles can be dried and otherwise further prepared for a catalyst application.

This sonochemical method may be practiced as a batch process or a continuous process. A continuous process is particularly amenable to scale-up for production of substantial quantities of the particles of platinum of selected morphology.

Other objects and advantages of the invention will be apparent from a description of preferred embodiments which follows.

DESCRIPTION OF PREFERRED EMBODIMENTS

Figure 1:
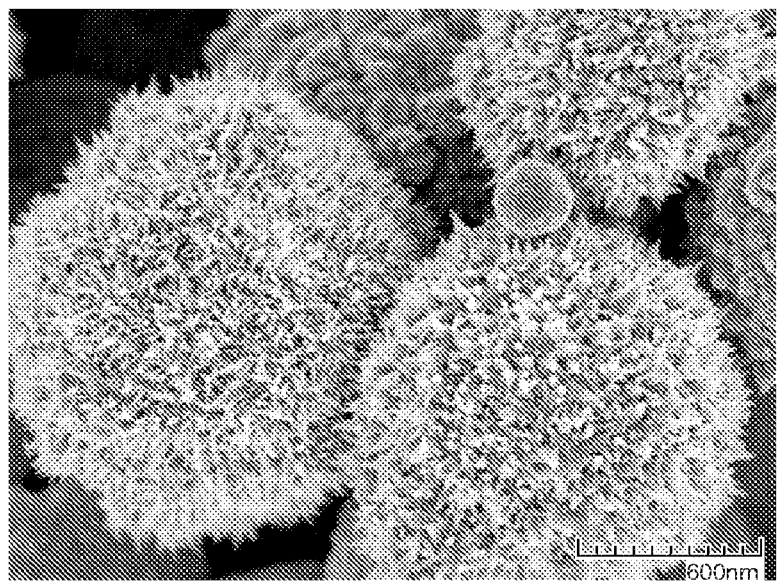
FIG. 1 is a SEM (scanning electron microscope) micrograph of relatively large spherical platinum particles with diameters of the order of one micrometer and a spike (or acicular) surface morphology (sometimes called "fuzz-ball" and also "sticky burr") prepared by decomposing a platinum salt ($H_2PtCl_6$) dissolved in water at about 60° C. using a relatively high ultrasonic power level.

This invention is a convenient methodology for preparing Pt particles with varying morphologies and sizes. Improved catalytic or electronic properties may be realized through the ability to vary processing conditions to obtain particles of different morphologies and different properties.

The idea of this invention is to deposit platinum under cavitation conditions to produce nanosize to micron-size platinum particles with varying shapes. Under cavitation conditions, platinum molecular compounds such as chloroplatinic acid, $H_2PtCl_6$; ammonium platinum (II) dinitrite, $(NH_3)_4Pt(NO_2)_2$; bis(ethylenediamine) platinum (II) dichloride, $[(NH_2CH_2CH_2NH_2)_2Pt]Cl_2$; dimethyl (1,5-cyclooctadiene) platinum (II), $(CH_3)_2Pt(C_8H_{12})$; or platinum (II) acetylacetonate, $Pt(CH_3COCHCOCH_3)_2$ can be reduced by hydrogen gas, or by radicals generated in solution by cavitation. Water, water-alcohol, or a hydrocarbon solvent with low vapor pressure, such as tridecane, decalin, or tetralin can serve as the reaction medium and may be cooled to sub-ambient temperatures. The temperature of the reaction vessel is determined for the desired platinum particle morphology and to manage the vapor pressure of the reaction medium and to affect a selective entrainment of the reactants into the bubbles formed by cavitation. A high-intensity ultrasound source or a high-shear mixer creates microscopic bubbles inside the reaction medium with diameters ranging from 10 to 200 μm with a lifetime of ~1 μs, in which temperatures and pressures can reach, respectively, 5000 K and 2 kbar. Each bubble is surrounded by a shell 2 to 10 μm in thickness, of extremely hot liquid in which the temperature can be as high as 2,000 K. Despite the extraordinary conditions in the bubbles, the bulk temperature of the liquid also influences the size and shapes of the platinum particles that are made. Under these conditions and with appropriate reductants, the platinum molecular compounds can be reduced to platinum metal.

As summarized above, the size and morphology of the particles can be controlled by adjusting the concentration of the precursor in the reaction medium, the bulk temperature of the medium in the reaction vessel, the choice of reductant, or the duration and intensity of the ultrasonic pulses. Generally, these parameters will be systematically varied during relatively small scale experiments to identify a desired platinum particle morphology from the variants that are produced during the exploratory testing. After a desired platinum particle size and shape has been identified the reactor size may be increased to produce suitable quantities of the catalyst.

EXPERIMENTAL

Example 1

A 20 mM aqueous solution of chloroplatinic acid, $H_2PtCl_6$, was prepared. 24 mL of solution, together with 1 mL butanol, was placed in a jacketed sonication cell in which the atmosphere could be controlled. The temperature of the solution was heated to 60° C. and maintained at that temperature by the circulation of heated water through the jacket of the cell. Anaerobic conditions were maintained inside the reaction vessel. An atmosphere of argon gas was maintained over the surface of the solution and hydrogen was slowly bubbled through the solution during the reduction reaction. The average pressure inside the reaction vessel was close to atmospheric pressure throughout the reduction reaction.

The solution was exposed to 750 W of vibrational energy at 20 kHz (ultrasound) for a total insonation period of one hour, with a duty cycle of 0.1 second "on" and 0.4 second "off." A precipitate formed in the water. The aqueous liquid was centrifuged and the solid was collected and washed with water and dried. The particles were confirmed to be elemental platinum.

FIG. 1 is a SEM micrograph (with a nanometer scale in the lower right corner of the figure) of a representative sample of the particles produced in this practice of the sonochemical reduction. The particles are seen to be generally spherical with diameters of the order of about one micrometer. The surfaces of the spherical particles are covered with spikes that markedly increase the surface areas of the particles. The surface spikes have the shape of isosceles triangles with heights of about 60 nm and apex angles smaller than 15 degrees. These particles have been characterized as "fuzz balls" or "sticky burrs."

The unique platinum particles illustrated in FIG. 1 are considered as having been produced by the high ultrasonic power practice of the process of this invention. The concentration of the chloroplatinic acid, the temperature of the aqueous solution and the power level of the applied ultrasonic energy all contributed to the formation of such unique platinum particle morphology.

Example 2

A second experiment was conducted under milder and lower power conditions.

A 0.8 mM aqueous solution of chloroplatinic acid, $H_2PtCl_6$, was prepared. 24 mL of solution, together with 1 mL butanol, were placed in a jacketed sonication cell in which the atmosphere could be controlled. The temperature of the solution was lowered to 4° C. and maintained at that temperature by the circulation of a refrigerated bath through the jacket of the cell. Anaerobic conditions were maintained inside the reaction vessel. An atmosphere of argon gas was maintained over the surface of the solution and hydrogen was slowly bubbled through the solution during the reduction reaction. The average pressure inside the reaction vessel was close to atmospheric pressure throughout the reduction reaction.

The solution was exposed to 225 W of vibrational energy at 20 kHz (ultrasound) for a total insonation time of one hour with a duty cycle of 0.1 second "on" and 0.4 second "off." A precipitate formed in the water. The aqueous liquid was centrifuged and the solid was collected and washed with water and dried. The particles were confirmed to be elemental platinum.

Figure 2:
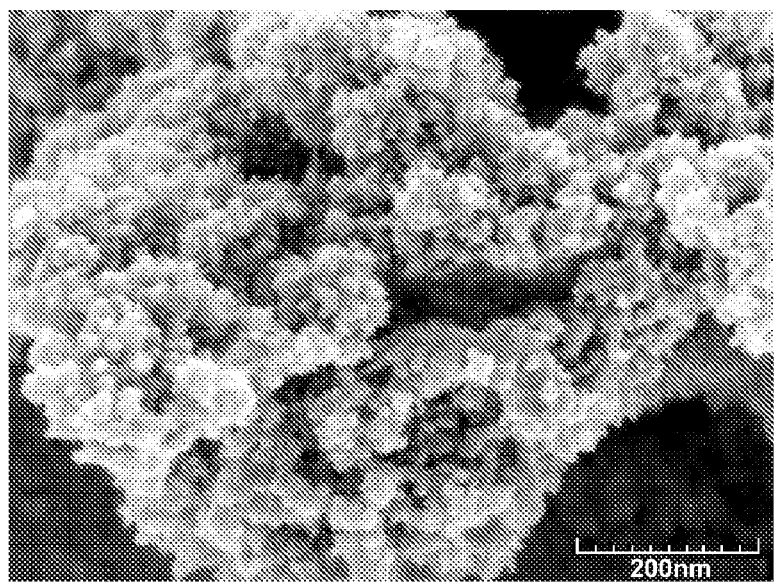
FIG. 2 is a SEM micrograph of a cauliflower-like agglomeration of very small platinum particles with smooth surfaces prepared by decomposing a platinum salt ($H_2PtCl_6$) dissolved in water at about 4° C. using a relatively low ultrasonic power level.

FIG. 2 is a SEM micrograph (with a nanometer scale in the lower right corner of the figure) of a representative sample of the particles produced in this practice of the sonochemical reduction. The particles are seen to be cauliflower-like agglomerations (with overall size of about 400 nm) of very small, almost spherical, smooth surface particles, from ten to forty nanometers in size. Though each platinum particle is quite small the particles are clustered into larger masses that are convenient for handling but still provide large surface area for catalytic action.

The unique platinum particles illustrated in FIG. 2 are considered as having been produced by a low power practice of the process of this invention. The relatively low concentration of the chloroplatinic acid, the below-ambient temperature of the aqueous solution and the low power level of the applied ultrasonic energy all contributed to the formation of such small but clustered smooth spherical surface platinum particle morphology.

Thus, the practice of the invention utilizes readily available platinum precursor compounds and conventional ultrasonically powered reactor systems to home-in on one of many possible platinum particle morphologies for catalytic activity. The use of low platinum precursor concentrations in the liquid medium coupled with below-ambient temperatures and relatively low ultrasonic power levels permits the formation of very small clustered spherical platinum particles with relatively smooth surfaces. By increasing one or more of these parameters; precursor concentration, bulk liquid temperature and/or ultrasonic power; the size of the particles may be increased and the presence of surface irregularities (for example, spikes) also increased.

The invention has been illustrated by a few examples of preferred embodiments, but the scope of the invention is not limited to these embodiments.

The invention claimed is:

1. A method of making platinum particles, the method comprising:
   suspending or dissolving at least one precursor compound of platinum at a predetermined concentration level in a liquid medium of water, a water and alcohol mixture, or a hydrocarbon selected from the group consisting of decane, dodecane, tridecane, decalin, and tetralin;
   heating the liquid to a temperature of about 60° C.;
   bubbling a reducing gas consisting essentially of hydrogen gas through the liquid medium; and
   subjecting the liquid medium to ultrasonic vibrations at a predetermined power level to reduce the precursor(s) to micrometer size, spherical platinum particles with surfaces containing spike-like protuberances.

2. A method of making platinum particles as recited in claim 1 in which the reducing gas is hydrogen.

3. A method of making platinum particles as recited in claim 1 in which the hydrogen gas is used in combination with at least one inert gas selected from the group consisting of argon, helium, neon, and nitrogen.

4. A method of making platinum particles as recited in claim 1 in which the liquid medium is water.

5. A method of making platinum particles as recited in claim 1 in which the liquid medium is a hydrocarbon selected from the group consisting of decane, dodecane, tridecane, decalin, and tetralin.

6. A method of making platinum particles as recited in claim 1 in which the precursor compound is a platinum halide or an organo-platinum compound.

7. A method of making platinum particles as recited in claim 1 in which the precursor compound comprises at least one compound selected from the group consisting of chloroplatinic acid, bis(ethylenediamine) platinum (II) dichloride, dimethyl (1,5-cyclooctadiene) platinum (II), and platinum (II) acetylacetonate.

8. A method of making platinum particles, the method comprising:
   suspending or dissolving at least one precursor compound of platinum at a predetermined concentration level in a liquid medium of water or a water and alcohol mixture;
   heating the liquid to a temperature of about 60° C.;
   bubbling a reducing gas consisting essentially of hydrogen gas through the liquid medium to maintain anaerobic conditions; and
   subjecting the liquid medium to ultrasonic vibrations at a predetermined power level to reduce the precursor(s) to micrometer size, spherical platinum particles with surfaces containing spike-like protuberances.

9. A method of making platinum particles as recited in claim 8 in which the reducing gas is hydrogen.

10. A method of making platinum particles as recited in claim 8 in which the hydrogen gas is used in combination with at least one inert gas selected from the group consisting of argon, helium, neon, and nitrogen.

11. A method of making platinum particles as recited in claim 8 in which the liquid medium is water.

12. A method of making platinum particles as recited in claim 1 in which the precursor compound is a platinum halide or an organo-platinum compound.

* * * * *